Oct. 17, 1967         C. B. GWYN, JR         3,346,951
METHOD OF MAKING ELECTRICAL CONTACT ELEMENTS
Filed Feb. 24, 1966         2 Sheets-Sheet 1
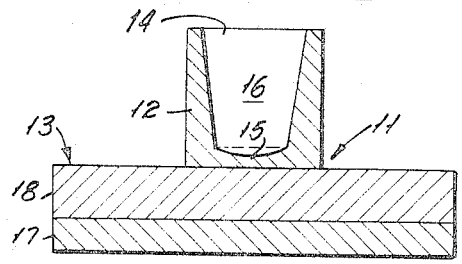
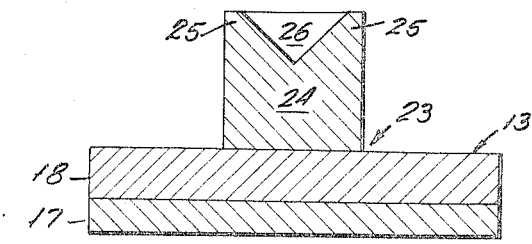
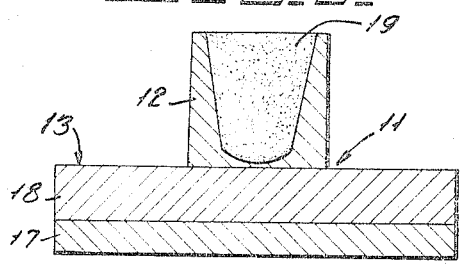
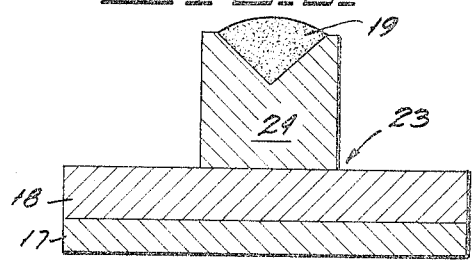
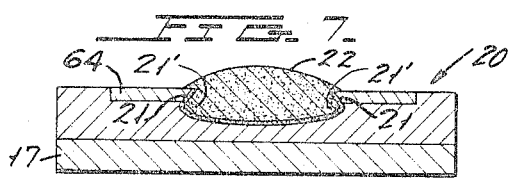
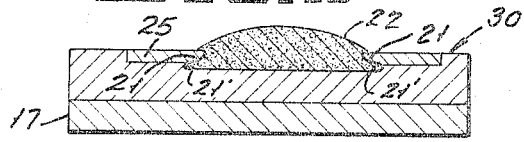
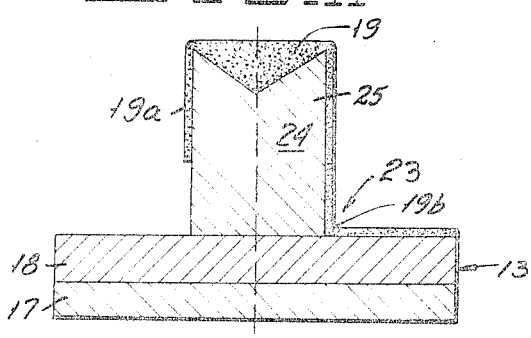
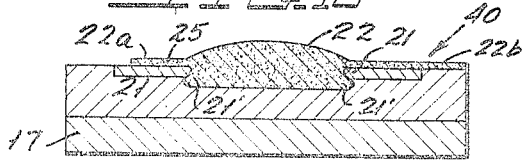
INVENTOR.
CHILDRESS B. GWYN, JR.
BY
OSTROLENK, FABER, GERB & SOFFEN
ATTORNEYS Oct. 17, 1967　　　　C. B. GWYN, JR　　　　3,346,951
METHOD OF MAKING ELECTRICAL CONTACT ELEMENTS
Filed Feb. 24, 1966　　　　2 Sheets-Sheet 2
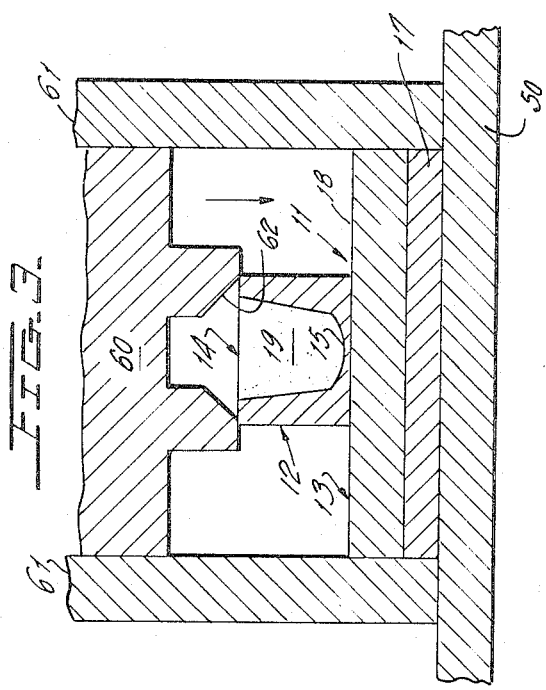
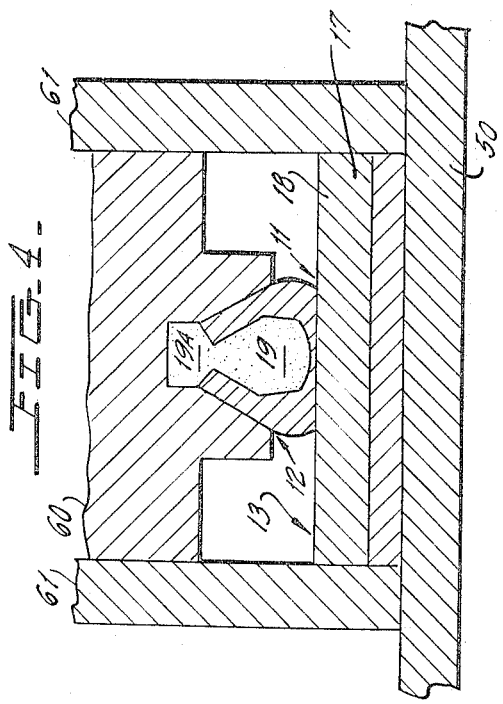
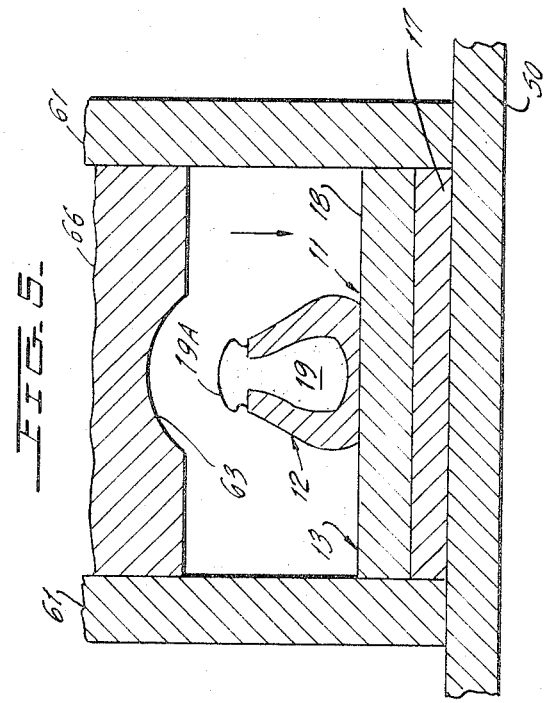
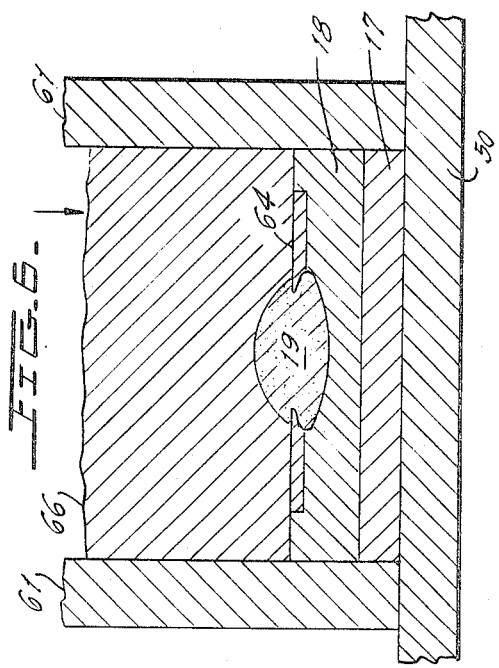

United States Patent Office 3,346,951
Patented Oct. 17, 1967

3,346,951
METHOD OF MAKING ELECTRICAL CONTACT ELEMENTS
Childress B. Gwyn, Jr., Export, Pa., assignor to Talon, Inc., Meadville, Pa., a corporation of Pennsylvania
Filed Feb. 24, 1966, Ser. No. 539,602
8 Claims. (Cl. 29—630)

ABSTRACT OF THE DISCLOSURE

A method for making projection welding electrical make-and-break contact elements in which an iron or other powder metal composition is deposited within a recess in a rivet shaped base component, and the composite is subjected to two successive forming operations, in the first of which the base member material is peripherally deformed inwardly of the powder metal composition and the latter is compacted and partially extruded outwardly of the base member, and in the second of which operations the extruded powder metal composition is forced over and envelops the base member to define the desired projection welding surface on the composite element.

This application is a continuation-in-part of copending application Ser. No. 246,552 filed on Dec. 21, 1962, now abandoned.

This invention relates to a method of making electrical contact elements, and more particularly to such a method for making projection welding type electrical make-and-break contacts.

It is known to make silver-faced composite projection welding type contacts by initially producing a suitable silver face member by punching, blanking or like operations and thereafter bonding a base metal support thereto. In accordance with known procedures, the silver facing is coated with a flux medium and a suitably proportioned processed brazing or soldering material is then coated upon the flux, prior to superimposing the base metal support thereon. While these members are maintained in properly positioned relationship within a jig or other fixture they are heated, in a neutral or reducing atmosphere, at such a temperature and for a sufficient length of time to cause the brazing or soldering medium to melt and flow and to thereby wet and alloy with or otherwise integrate the silver facing and the base metal supporting member. The parts are then maintained in position until they have been cooled below the melting and flow points of the brazing or soldering medium, and the resulting composite contact element is thereafter removed from the mounting jig. This procedure is, however, time consuming and relatively complex and is additionally subject to contamination of the working surfaces of the silver facing by the brazing or soldering media which may seriously impair, if not destroy, the utility of the contact for electrical make-and-break contact purposes.

It is also known to manufacture projection welding contacts by making an overlay or sandwich of the silver facing element and the base metal supporting member, blanking the composite contact therefrom and subsequently coining the contact to the final dimensions desired. While such operations can produce satisfactory contacts there is a concomitant production of relatively large amounts of scrap resulting from the blanking and trimming steps, introducing the necessity to reclaim the silver from the skeleton remaining from the initial blanks.

Yet another procedure for manufacturing projection welding make-and-break contacts is the so-called fusion or puddling techniques disclosed in my prior Patents 2,049,771 and 2,199,240. These procedures are limited to use of contact facing materials which can be melted without changing their desired characteristics and which have lower melting points than the base metal supporting members employed; moreover, such procedures are in general limited to the projection welding contacts having solely two component parts, the silver or suitable electrical contact material facing and the base metal backing.

In my copending application Ser. No. 234,479, filed on Oct. 31, 1962, one particularly effective method for making projection welding contacts is described, involving aligning a pair of rivet shaped metallic contact components, one of which includes a tubular body having a generally cylindrical recess extending through the major portion of the shank thereof and the other of which includes a solid cylindrical body having shoulder portions defining a depression extending through a minor portion of the body, and pressing the components together to force the cylindrical body within the recess, the shoulder portions thereof compressing the abutting walls of the tubular body to form a composite contact in which the shoulder portions define indentations within the walls of the tubular body.

It is among the objects of the present invention to provide a further method for making projection welding type electrical make-and-break contact elements for efficient mass production application.

Other objects and advantages of the present invention will become apparent hereinafter.

I have now found that a projection welding electrical make-and-break contact element may be readily produced by providing a base contact member, preferably in the form of a contact rivet, having a recess therein for receiving a projection welding material, depositing a finely divided metallic projection welding composition in such recess and applying pressure to the composition and to the base contact member to compact the metal composition and force portions thereof into abutment with the walls of the base contact member. The compacted finely divided metal forms indentations in such walls and interlocks therewith, resulting in the formation of a composite contact element in which the metallic composition defines a projection welding surface integrally formed with the base contact member.

The deposition of the particulate metallic projection welding contact material and the subsequent compaction of the same to produce interlocking with the base contact member provides a simple procedure which may be readily practiced in large scale operations, and which produces highly reliable contact elements providing good performance and long life characteristics.

For a fuller understanding of the nature of the invention, reference is made to the following detailed description taken in connection with the accompanying drawings showing, for purposes of exemplification without limitation, preferred embodiments of the invention, in which:

FIGURES 1 to 7 are schematic sectional views, greatly exaggerated for purposes of illustration, showing the stages in the assembly of a projection welding contact, employing a tubular rivet-shaped base contact member according to one form of the invention;

FIGURES 8 to 10 are similar schematic sectional views illustrating the stages in the assembly of a further projection welding contact, employing a different form of base contact member according to a further embodiment of the invention; and FIGURES 11 and 12 are composite sectional views showing two stages in the assembly of a further contact element, utilizing two variants of the method of the invention.

Referring initially to FIGURES 1 to 7, a rivet-shaped base contact member 11 is illustrated having a tubular shank 12 and a base or head portion 13. The shank 12 includes a generally cylindrical recess 14 defined by a rounded or conical base portion 15 and an outwardly diverging frusto-conical portion 16 abutting the end surface of the shank 12.

The tubular rivet 11 illustrated in the drawing is a composite member constituted of a silver layer 17 and a copper layer 18. While, in the illustrated embodiment, the base portion 13 of the rivet is composed of the composite silver and copper layers and the shank 12 thereof is constituted of copper, it will be understood that the rivet 11 may be entirely homogeneous and may be entirely composed, for example, of silver.

As illustrated in FIGURE 2, a finely divided metallic composition 19 is deposited in recess 14 for the preparation of a projection welding surface for the contact element. The metallic composition may be in the form of a powder, shavings, filings or the like, so long as it is provided in finely divided particulate form. While it is preferred to employ finely divided iron particles, other materials, e.g., finely divided iron-tin mixtures, nickel, aluminum, or nickel-copper alloy (such as "Monel" metal) compositions, may similarly be utilized in the practice of the invention.

Upon applying suitable pressure to the projection welding metal composition and the base contact member 11 within a die or fixture, such components are permanently interlocked to define the composite contact element 20 illustrated in FIGURE 7. The forming and compacting operation is carried out through the successive progressive steps illustrated in FIGURES 3 to 6, inclusive. In FIGURE 3 the contact components are illustrated within a forming die comprising an outer shell 61 including a contained plunger or ram body 60, capable of guided and confined movement through outer shell 61. The die 61 rests upon a movable base 50, which may optionally be flat or recessed and which acts as a support or foundation for the die assembly.

The forming contour 62 of ram 60 has a configuration designed to inwardly fold or distort the material of shank 12, while simultaneously partially encompassing and compacting the powder metal composition 19. Thus, as shown in FIGURE 4, the powder metal 19 is compacted within the shank material while a portion of the powder metal composition is simultaneously extruded or squeezed outwardly during compression of the contact components, thereby forming an extruded portion 19A.

Following the initial forming action shown in FIGURE 4, the ram 60 is withdrawn. The die 61 and partially formed composite contact element may then be indexed by movable base 50 or otherwise placed in forming relation with a second forming ram 66 (see FIGURES 5 and 6). The face of ram 66 has a suitably shaped recess 63 for forming the final configuration of the desired projection welding contact element. When ram 66 is advanced to compact the composite element (as shown in FIGURE 6) the previously, partially formed contact is forced into its final and desired configuration with the original shank material 12 shaped into surface layer 64 defining a portion of the upper surface of the composite element and the powder metal 19 forming a welding button superposed on and interlocked with both layer 64 and the underlying layer 18.

The forming surfaces 62 and 63 on rams 60 and 66 illustrated in FIGURES 3 and 5, respectively, are designed to provide the specific shape of the composite element illustrated in FIGURE 7. If, however, it is desired to provide composite elements having differing shapes, the forming surface 62, constituted of a first cylindrical surface and a contiguous frusto-conical surface, and the forming surface 63, having a concave shape, may be modified as desired. By thus modifying the forming surfaces and/or changing the initial configuration of the component blanks to be formed, composite contacts having differing configurations may be readily prepared, such as those described more fully hereinafter in connection with the embodiments shown in FIGURES 8 to 12 of the drawings.

In the embodiment illustrated in FIGURES 8 to 10, inclusive, a rivet shaped base contact member 23 is employed, which member includes a solid cylindrical body 24 having shoulder portions 25 defining a conical depression 26 extending through a minor portion of the cylindrical body. As in the embodiment illustrated in FIGURES 1 to 7, the metallic projection welding composition 19 is deposited within the recess, and upon compression within a suitable die defines a projection welding surface 22 integrally secured to the compacted base member 23 by indented portions 21' which undercut and are interlocked with the walls 21 of the base member. The resulting composite contact element 30 is shown in FIGURE 10.

As illustrated in FIGURES 11 and 12, the outer walls of the solid cylindrical body 24 of a base contact member 23 may be partially or entirely covered with the projection welding composition 19, prior to compacting the components to produce the composite contact element. The partial covering of the base contact member is illustrated in Section A of FIGURES 11 and 12, whereas the total covering of the base contact member is illustrated in Section B of the figures. Hence, as illustrated at 19a in FIGURE 11, the finely divided metallic composition may be applied to a portion of the walls of body 24 or may, as illustrated at 19b, be applied over the entire surface of the cylindrical body 24 and over the adjacent surfaces of the base or head portion 13. When such a base contact member is compressed, the resulting composite contact element 40 (FIGURE 12) possesses a projection welding surface 22 interlocked with the compacted base member by means of indentations 21' formed in the walls 21 thereof, as indicated hereinabove, and includes projection welding surfaces 22a or 22b extending, respectively, across a portion or across all of the abutting surfaces of the base contact material.

In some instances the union between the contact components, whether formed according to the embodiments disclosed in FIGURES 1 to 7 or 8 to 10, may be further enhanced by simultaneously passing an electrical current between the welding metal composition and the base contact member. An annealing or welding action is thereby effected, creating a flow of a portion of the material of the walls of the shank 12 or solid cylindrical body 24 into the body of the projection welding material 19, thereby improving interlocking engagement between the two materials. The heating action may suitably be controlled to cause only annealing of the materials or to actually effect fusion or welding of the same as desired.

It will be understood that the base contact member may be provided in the form of a suitable recessed disc or in any other desired form suited for the particular application involved, rather than in the rivet-like configuration of FIGURES 1 and 8. Since this and other changes may be made in carrying out the above method without departing from the scope of the invention, it is intended that all matter contained in the above description shall be interpreted as illustrative and not in a limiting sense.

I claim:
1. A method of making a projection welding electrical make-and-break contact element comprising,
 (a) providing a base contact member having a recess therein for receiving a metallic projection welding composition,
 (b) depositing a finely divided metallic projection welding composition in said recess,
 (c) forcing a forming member having an outwardly diverging forming contour against said metallic projection welding composition and said base contact member to inwardly deform the walls of said base contact member and simultaneously partially encompass and compact said metallic composition therein, a pre-form thereby being produced in which the remaining portion of said metallic projection welding composition is extruded outwardly of said walls, and
(d) forcing a second forming member having a substantially concave forming contour against the resulting pre-form to force the extruded metallic projection welding composition to envelop at least a portion of the deformed base contact member, the thus deformed compacted metallic projection welding composition interlocking with the previously inwardly deformed walls of said base contact member to thereby define a composite contact element having a projection welding surface formed integrally thereon.

2. The method as defined in claim 1, in which said metallic projection welding composition is a material selected from the group consisting of iron, mixtures of iron and tin, nickel, aluminum, and alloys of nickel and copper; and in which the base contact member is a material selected from the group consisting of a silver and silver-copper composite.

3. The method as defined in claim 1, in which the projection welding metallic projection welding composition and the base contact member are subjected, in each of steps (c) and (d) to a compressive force of at least one ton per square inch, said force being rapidly applied thereto at a velocity of at least 10 inches per second to form the integrally bonded composite contact element.

4. A method of making a projection welding electrical make-and-break contact element comprising,
  (a) providing a rivet shaped base contact member including a shank having a recess extending longitudinally thereof for receiving a metallic projection welding composition,
  (b) depositing a finely divided metallic projection welding composition in said recess,
  (c) forcing a forming member having an outwardly diverging forming contour against said metallic projection welding composition and the shank of said base contact member to inwardly deform the walls of said shank and simultaneously partially encompass and compact said metallic projection welding composition therein, a pre-form thereby being produced in which the remaining portion of said metallic projection welding composition is extruded outwardly of said walls; and
  (d) forcing a second forming member having a substantially concave forming contour against the resulting pre-form to force the extruded metallic projection welding composition to envelop at least a portion of the deformed base contact member, the thus deformed compacted metallic projection welding composition interlocking with the previously inwardly deformed walls of the shank of said base contact member to thereby define a composite contact element having a projection welding surface formed integrally thereon.

5. The method as defined in claim 4, in which said metallic projection welding composition is a material selected from the group consisting of iron, an iron-tin mixture, nickel, aluminum, and an alloy of nickel and copper; and in which the base contact member is a material selected from the group consisting of a silver and silver-copper composite.

6. The method as defined in claim 4, in which said base contact member includes a tubular body having an elongated recess extending through the major portion thereof for receiving the metallic projection welding composition, said recess including a base conical section tapering into a diverging frusto-conical section extending to the outer end of said tubular body.

7. The method as defined in claim 4, in which said base contact member includes a solid cylindrical body having shoulder portions defining a conically shaped depression extending through a minor portion of said cylindrical body for receiving said metallic projection welding composition.

8. The method as defined in claim 4, in which the finely divided metallic projection welding composition is deposited in said recess and on at least a portion of the outer walls of said shank, and in which pressure is applied, in steps (c) and (d) to said composition and to the base contact member in order to form a projection welding surface extending over a major portion of the compacted base contact member.

References Cited
UNITED STATES PATENTS

| | | | |
|---|---|---|---|
| 2,361,087 | 10/1944 | Cox | 29—155.55 X |
| 2,883,215 | 4/1959 | Jenkins | 219—99 X |
| 3,034,202 | 4/1962 | Graves | 29—155.55 |
| 3,040,119 | 6/1962 | Granzow | 29—155.5 |
| 3,189,978 | 6/1965 | Stetson | 29—155.5 |
| 3,191,272 | 6/1965 | Gwyn | 29—155.55 |
| 3,226,517 | 12/1965 | Schreiner | 29—155.55 X |

JOHN F. CAMPBELL, *Primary Examiner.*

R. W. CHURCH, *Assistant Examiner.*